United States Patent
Surply et al.

(10) Patent No.: US 9,708,071 B2
(45) Date of Patent: Jul. 18, 2017

(54) AIRCRAFT PROPULSION SYSTEM COMPRISING AN AFT PYLON FAIRING WITH LATERAL WALLS THAT ARE PROFILED FOR INJECTING COOL AIR ALONG A THERMAL PROTECTION FLOOR

(71) Applicant: Airbus Operations (S.A.S.), Toulouse (FR)

(72) Inventors: Thierry Surply, Cornebarrieu (FR); Cyril Bonnaud, Toulouse (FR); David Grossein, Toulouse (FR); Stéve Bedoin, Toulouse (FR); Amadou AndréSylla, Toulouse (FR); Guillaume Drochon, Toulouse (FR); Marjorie Clottes, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/137,334

(22) Filed: Dec. 20, 2013

(65) Prior Publication Data
US 2014/0191080 A1    Jul. 10, 2014

(30) Foreign Application Priority Data
Jan. 9, 2013    (FR) ...................................... 13 50187

(51) Int. Cl.
*B64D 27/26* (2006.01)
*B64C 7/02* (2006.01)
(Continued)

(52) U.S. Cl.
CPC ................ *B64D 27/26* (2013.01); *B64C 7/02* (2013.01); *B64D 29/02* (2013.01); *B64D 33/04* (2013.01);
(Continued)

(58) Field of Classification Search
CPC ........ B64D 27/12; B64D 29/02; B64D 29/06; B64D 33/04; B64D 2027/26; B64D 2027/262; B64D 2027/264; B64C 7/02
(Continued)

(56) References Cited

U.S. PATENT DOCUMENTS 3,831,888 A * 8/1974 Baker et al. ..................... 244/54
5,524,847 A * 6/1996 Brodell et al. .................. 244/54
(Continued)

FOREIGN PATENT DOCUMENTS

| EP | 2 190 739 | 2/2011 | |
|---|---|---|---|
| FR | 2 898 336 | 9/2007 | |
| FR | 2991969 | * 11/2013 | ............... B64C 7/02 |

OTHER PUBLICATIONS

French Search Report for Application 1350187 dated Sep. 6, 2013.

*Primary Examiner* — Tien Dinh
*Assistant Examiner* — Christopher Hutchens
(74) *Attorney, Agent, or Firm* — Jenkins, Wilson, Taylor & Hunt, P.A.

(57) ABSTRACT

The invention proposes to protect a rear part of a floor of an aft fairing of a pylon of an aircraft bypass turbojet engine using a film of cool air formed of part of a bypass flow of the jet engine which is guided under the floor by two lateral wall portions of this fairing which have been profiled for this purpose. To do that, these two lateral wall portions delimit respective air passage spaces formed between a forward part of the floor and a jetpipe of the turbojet engine and which open laterally and towards the rear.

7 Claims, 5 Drawing Sheets

(51) Int. Cl.
*B64D 29/02* (2006.01)
*B64D 33/04* (2006.01)
*F01D 25/14* (2006.01)
*F02C 7/12* (2006.01)
*F02K 1/82* (2006.01)

(52) U.S. Cl.
CPC ............... F01D 25/14 (2013.01); F02C 7/12 (2013.01); *B64D 2027/268* (2013.01); *F05D 2220/327* (2013.01); *F05D 2260/202* (2013.01); *Y02T 50/675* (2013.01)

(58) Field of Classification Search
USPC .............................. 244/54, 177 A, 130, 131
See application file for complete search history.

(56) References Cited

U.S. PATENT DOCUMENTS

| | | | |
|---|---|---|---|
| 5,887,822 A * | 3/1999 | Thornock et al. | 244/53 R |
| 6,378,804 B1 | 4/2002 | Cambon | |
| 7,802,752 B2 * | 9/2010 | Papamoschou | 244/1 N |
| 8,523,516 B2 * | 9/2013 | Vauchel et al. | 415/121.2 |
| 8,662,440 B2 | 3/2014 | Journade et al. | |
| 8,757,546 B2 * | 6/2014 | Porte et al. | 244/129.4 |
| 8,827,199 B2 * | 9/2014 | Aeberli et al. | 244/1 N |
| 8,840,061 B2 * | 9/2014 | Caruel et al. | 244/54 |
| 2009/0134271 A1 * | 5/2009 | Baillard et al. | 244/54 |
| 2012/0104161 A1 | 5/2012 | Shah | |
| 2013/0118599 A1 * | 5/2013 | James et al. | 137/15.1 |
| 2014/0202169 A1 * | 7/2014 | Gaillot | B64C 7/02 60/797 |

* cited by examiner

AIRCRAFT PROPULSION SYSTEM COMPRISING AN AFT PYLON FAIRING WITH LATERAL WALLS THAT ARE PROFILED FOR INJECTING COOL AIR ALONG A THERMAL PROTECTION FLOOR

CROSS-REFERENCE TO RELATED APPLICATION

This application claims priority to French Patent Application No. 13 50187 filed on Jan. 9, 2013, the entire content of which is incorporated by reference herein.

DESCRIPTION

Technical Field

The present invention relates to the field of aircraft propulsion systems and deals more specifically with the thermal protection of a pylon used for mounting a bypass turbojet engine.

In general, a pylon, also referred to as an "EMS" (which stands for "Engine Mounting Structure"), is used to suspend an engine underneath the wing structure of an aircraft, for mounting this engine on top of this same wing, or even for attaching this engine to a rear part of the aircraft fuselage.

Background

As illustrated schematically in FIG. 1, the connection between a bypass turbojet engine 10 and an airframe 12 of an aircraft is provided by a pylon 14. The latter is able to transmit to the structure of the aircraft the loads generated by its associated turbojet engine and also allows fuel, electrical systems, hydraulic systems and air to be routed between the turbojet engine and the airframe of the aircraft. In the example illustrated, the element of the aircraft airframe to which the turbojet engine is attached is a wing 15. The turbojet engine 10 and the pylon 14 together form a propulsion system 8.

In the description that follows, front and rear are defined relative to a direction of forward travel F of the aircraft.

In addition, by convention, the longitudinal direction of the pylon 14 which is also likenable to the longitudinal direction of the turbojet engine 10 is referred to as X, this direction X being parallel to a longitudinal axis of the turbojet engine. Also, the direction oriented transversally to the pylon 14 and also likenable to the transverse direction of the turbojet engine 10 is referred to as Y, and the vertical direction or height is referred to as Z, these three directions X, Y and Z being mutually orthogonal.

In order to transmit load, the pylon 14 comprises a rigid structure 16, also referred to as the primary structure, generally of the "box section" type, i.e. formed by assembly of upper and lower spars and of lateral panels joined together by transverse stiffening ribs. The pylon is equipped with means of attachment such as engine mounts 18, 20 and rods 22 for reacting thrust forces, these means of attachment being interposed between the turbojet engine 10 and the rigid structure 16 of the pylon in order to connect these elements together.

Moreover, the pylon 14 is provided with a plurality of secondary structures which segregate and hold the systems, while at the same time supporting fairing elements, the latter generally taking the form of collections of panels attached to the structures. In a way known to those skilled in the art, the secondary structures differ from the rigid structure in that they are not intended to transfer load from the turbojet engine and that needs to be transmitted to the airframe of the aircraft.

Included among the secondary structures there is generally a front aerodynamic structure 24, a rear aerodynamic structure 26 sometimes referred to as an RSS (which stands for "rear secondary structure"), a fairing 28 connecting the front and rear aerodynamic structures and also referred to as a "karman" and an aft fairing 30.

The aft fairing 30, also referred to as "APF" (which stands for "Aft Pylon Fairing"), performs a number of functions including forming a thermal or fire barrier, and ensuring aerodynamic continuity between the outlet from the turbojet engine and the pylon. This fairing adopts a lower position when the turbojet engine is intended to be positioned under a wing, and adopts an upper position when the turbojet engine is intended to be placed on top of a wing. An example of an aft fairing known from the prior art is disclosed in document EP 2 190 739.

The aft fairing 30 generally takes the form of a box section comprising two lateral walls 32 joined together by transverse internal stiffening ribs 34 spaced apart in a longitudinal direction X of the fairing, and a floor 36 for thermal protection, sometimes referred to as a "heat shield".

The lateral walls 32 of the aft fairing are designed to be hugged on the outside by a bypass flow 38 of the turbojet engine, because of how they are installed in the annular bypass duct 40 of the turbojet engine and/or at the outlet of this duct.

The floor 36 of the aft fairing 30 has an external face designed to be hugged by a primary flow 42 of the turbojet engine which consists of exhaust gases. As FIG. 2 shows, a rear part 44 of this floor 36 extends substantially in the continuation of a jetpipe 45 which separates the primary flow 42 from the bypass flow 38 and is positioned in the continuation of an internal annular cowl 46 internally delimiting the bypass flow 38. A forward part 48 of the floor 36 extends in line with the jetpipe 45. The forward 48 and rear 44 parts of the floor 36 are connected to one another by sheet rebating 47 (FIG. 2). In addition, the jetpipe 45 extends around an ejection bullet 49 intended to guide the primary flow 42 in a way that is well known.

FIG. 3 schematically illustrates the propulsion unit 8 viewed in perspective and in section on the plane III-III of FIG. 2. This plane III-III extends transversally, i.e. at right angles to a longitudinal axis 50 of the turbojet engine 10, and is situated at the rear end of the jetpipe 45.

FIG. 3 shows an outer annular cowl 51 (not visible in FIGS. 1 and 2) which externally delimits the annular bypass duct 40 of the turbojet engine around the internal annular cowl 46, and is connected to the latter by a longitudinal wall 52, commonly referred to as a fork wall.

As illustrated in FIG. 3, a space 53 is generally formed between the front part 48 of the floor 36 and the jetpipe 45 to allow relative movements between the turbojet engine 10 and the pylon 14, in which case lateral seals 54 are provided on each side of the aft fairing 30 to close off the space 53 laterally, in a way that is well known.

FIG. 4 illustrates the primary 42 and bypass 38 flows leaving their respective flow ducts, viewed from above, and in particular depicts the rear part 44 of the floor 36 of the aft fairing 30 in contact with the primary flow 42.

The temperature of the exhaust gases that make up the primary flow 42 leaving the turbojet engine 10 may exceed 600° C.

Furthermore, this temperature tends to increase with recent developments in the techniques used in turbojet engines.

Now, the increase in temperature of the primary flow increases the demands, in terms of heat resistance, of the materials of which the aft fairing is made. The high temperature levels and gradients to which the aft fairing is subjected thus dictate the use of heavy and costly materials such as steel in order to prevent cracks from appearing or rivets from being lost.

SUMMARY

It is a notable object of the invention to provide a simple, economical and effective solution to this problem.

To this end, the invention proposes a propulsion system for an aircraft, comprising a bypass turbojet engine and a pylon intended to attach this turbojet engine to the airframe of an aircraft, the said pylon comprising an aft fairing comprising two lateral walls and a floor to protect the said pylon from the heat of a primary flow ducted by a jetpipe of the said turbojet engine.

According to the invention, the said floor has two lateral floor portions positioned one on either side of a mid-plane of the said aft fairing and separated from the said jetpipe so that the said lateral floor portions with the said jetpipe respectively delimit two air passage spaces which are open laterally and towards the rear of the said propulsion system.

In addition, each of the said lateral walls of the said aft fairing comprises, at its end facing the said jetpipe, a lateral wall portion which extends rearwards and towards the said mid-plane and which delimits one of the said air passage spaces.

The invention thus proposes two profiled portions at the base of each lateral wall of the aft fairing, facing the jetpipe, so as to inject some of the turbojet engine bypass flow under the floor of the aft fairing and thus form a film of cool air able to protect the said floor from the heat of the primary flow.

For preference, each of the said lateral wall portions is curved and has a convex face facing towards the outside of the said aft fairing when the latter is viewed in section on a plane orthogonal to the said mid-plane and parallel to a longitudinal axis of the said bypass turbojet engine.

That makes it possible to optimize the guidance of the bypass flow along the said lateral wall portions, and in particular to limit the risk of separation of this bypass flow.

Moreover, the separation between each of the said lateral floor portions and the said jetpipe at a rear end of the corresponding lateral wall portion is preferably comprised between 2% and 15% of a maximum width of the said aft fairing at a trailing edge, namely a rear end, of the said jetpipe.

Such a separation makes it possible to optimize the flow rate of that part of the bypass flow that flows along the said air passage spaces.

Moreover, the said jetpipe advantageously comprises an extension extending as a projection rearwards and facing the said floor of the said aft fairing.

Such an extension makes it possible to extend rearwards the guidance of the part of the bypass flow that leaves the said air passage spaces along the said floor.

For preference, the said two lateral walls of the said aft fairing extend respectively in the continuation of two fork walls which connect together two annular cowls which, respectively on the inside and on the outside, delimit an annular space in which a bypass stream flows through the said turbojet engine.

The invention also relates to an aircraft comprising at least one propulsion system of the type described hereinabove.

BRIEF DESCRIPTION OF THE DRAWINGS

The invention will be better understood, and other details, advantages and features thereof will become apparent from reading the following description given by way of nonlimiting example and with reference to the attached drawings in which.

Throughout all these figures, identical references may denote elements that are identical or analogous.

DETAILED DESCRIPTION

Figure 1:
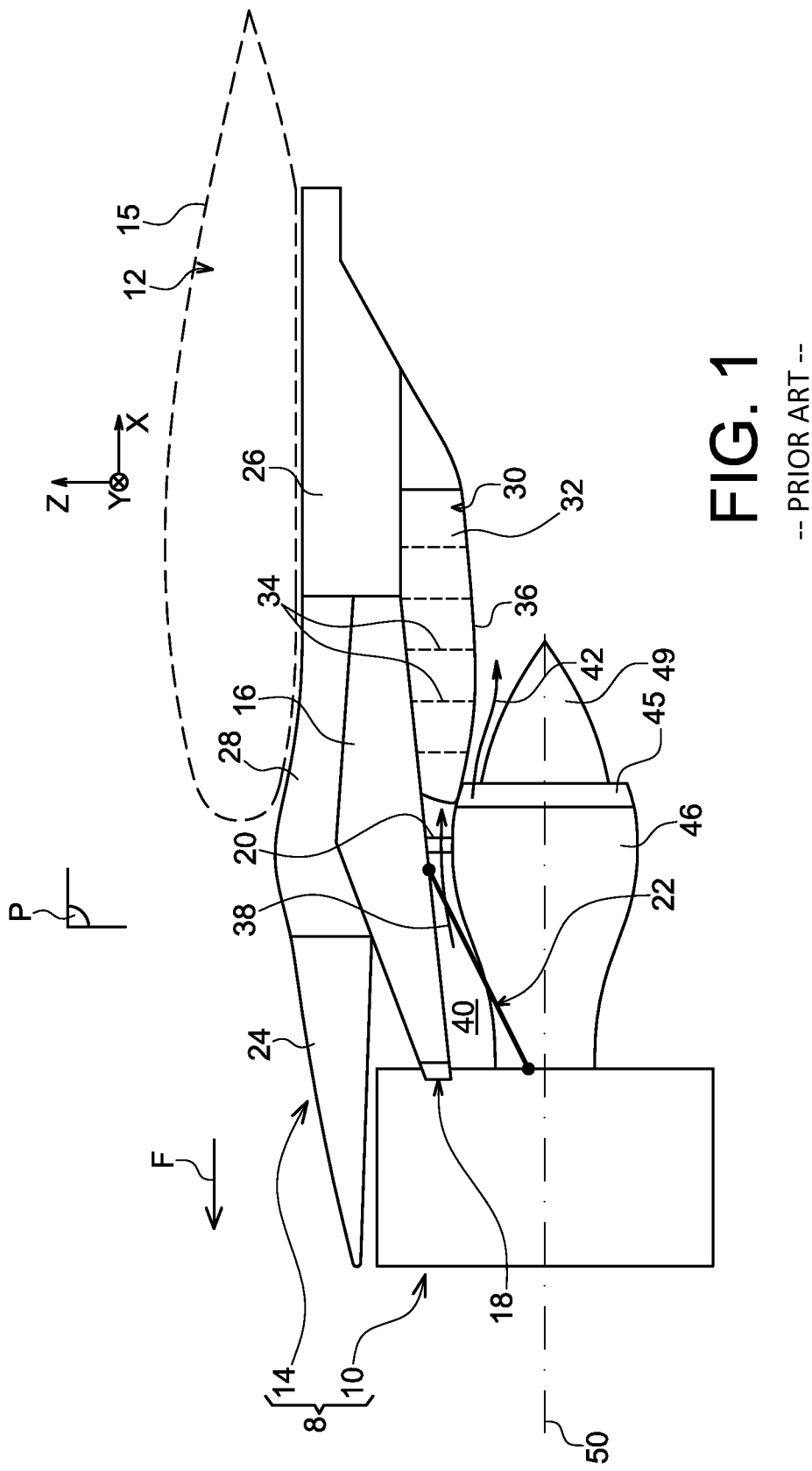
FIG. 1, already described, is a partial schematic side view of a propulsion system for an aircraft of known type.
Figure 2:
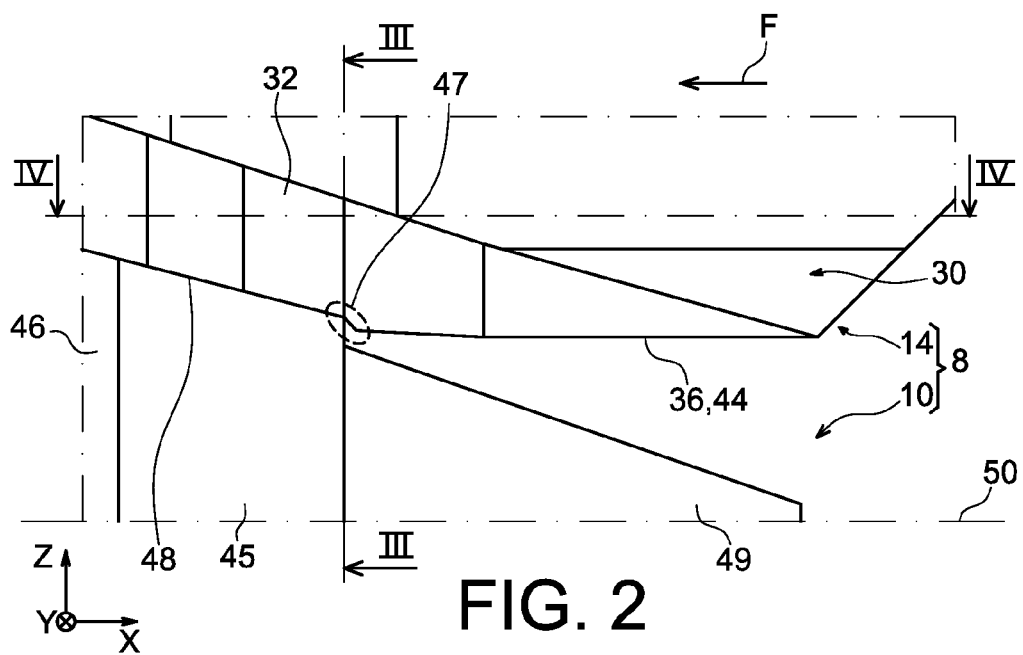
FIG. 2, already described, is a partial schematic side view on a larger scale of the propulsion system of FIG. 1.
Figure 3:
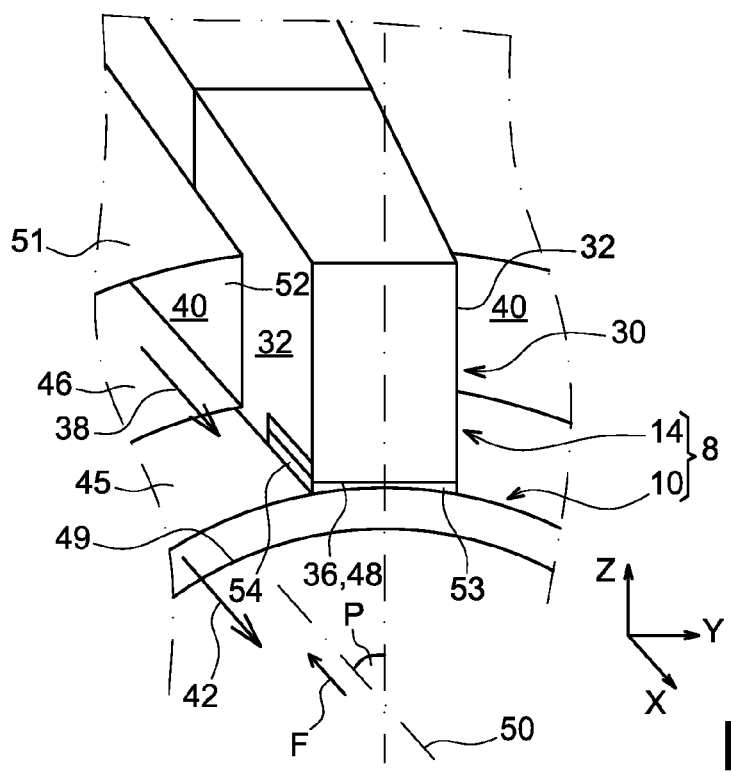
FIG. 3, already described, is a partial schematic view in perspective and in section on the plane III-III of FIG. 2, of the propulsion system of FIG. 1.
Figure 4:
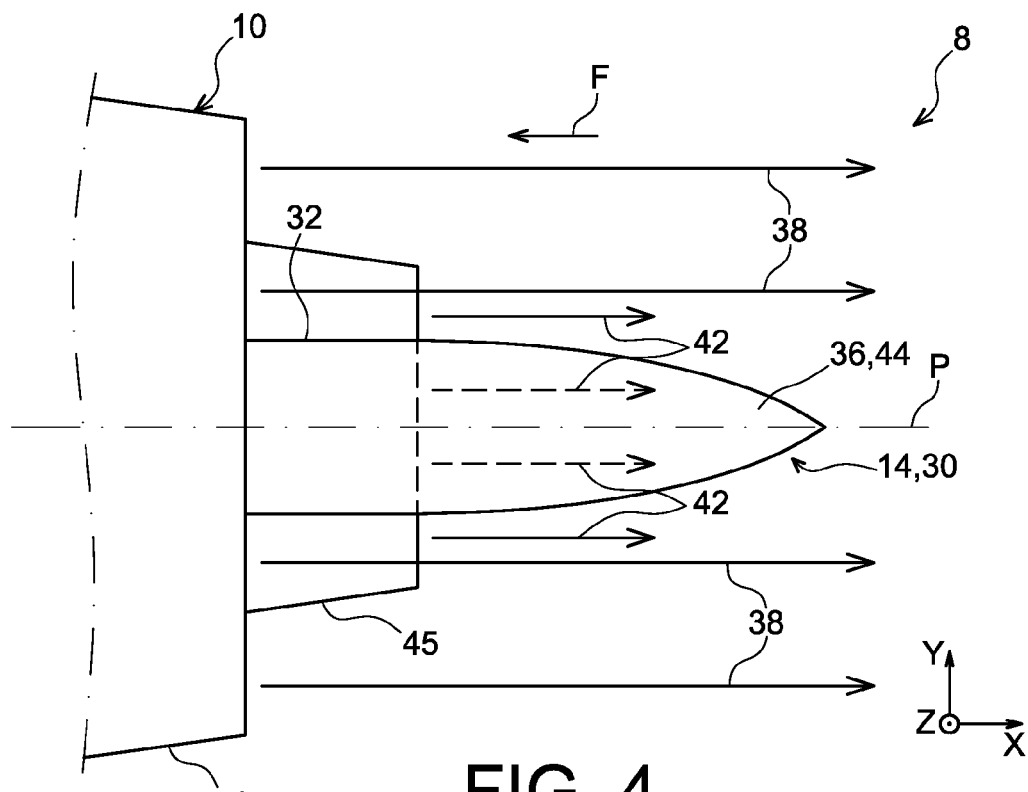
FIG. 4, already described, is a partial schematic view of the propulsion system of FIG. 1 in section on plane IV-IV of FIG. 2.
Figure 5:
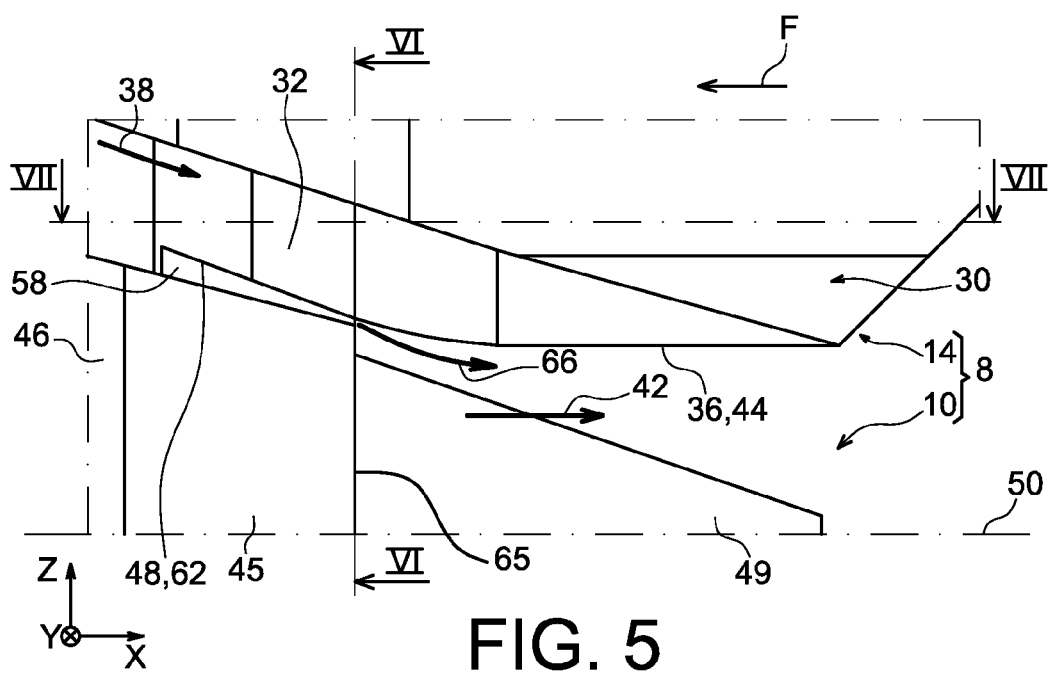
FIG. 5 is a view similar to FIG. 2, illustrating a propulsion system according to a first preferred embodiment of the invention.
Figure 6:
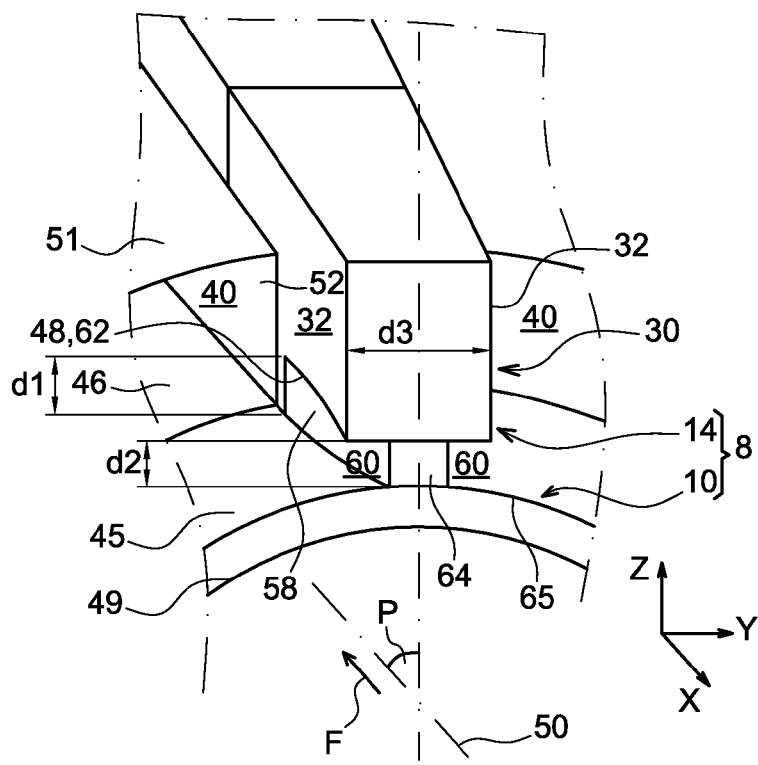
FIG. 6 is a view similar to FIG. 3, in section on the plane VI-VI of FIG. 5 and illustrating the propulsion system of FIG. 5.
Figure 7:
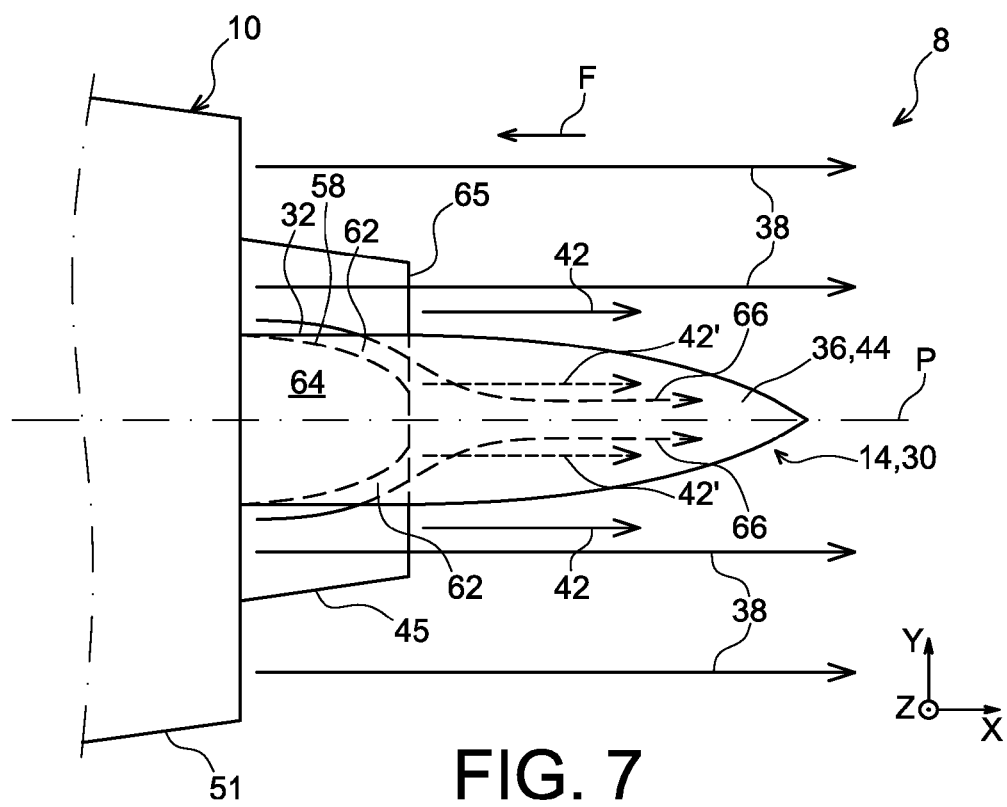
FIG. 7 is a view similar to FIG. 4, in section on the plane VII-VII of FIG. 5 and illustrating the propulsion system of FIG. 5.

FIGS. 5 to 7 illustrate a propulsion system 8 according to a first preferred embodiment of the invention.

This propulsion system differs from the propulsion system of FIGS. 1 to 4 in terms of the configuration of the aft fairing 30.

The latter has two opposite lateral walls 32 extending one on each side of a mid-plane P of the aft fairing 30 (FIG. 6) and each comprising a lateral wall portion 58 which forms a lower rear end of the lateral wall and extends rearwards and towards the mid-plane P. Each lateral wall portion 58 thus forms a discontinuity with respect to the corresponding lateral wall 32. Each lateral wall portion 58 extends in line with the jetpipe 45 and thus delimits an air passage space 60 formed between a corresponding lateral floor portion 62 and the jetpipe 45.

Each of the two air passage spaces 60 thus defined is open to the side (FIGS. 6 and 7).

In addition, the two lateral wall portions 58 in themselves delimit a base 64 of the aft fairing 30, namely a structure projecting downward from the forward part 48 of the floor 36 and separating the two air passage spaces 60 from one another.

The base 64 may be formed of a solid or hollow structure. In the latter instance, the lateral wall portions 58 may adopt the form of sliding seals working, for example, on the same well known principle as the seals 54 in FIG. 3, so as to allow the aft fairing 30 a degree of vertical movement in relation to the jetpipe 45.

As is more clearly apparent in FIG. 7 which shows a view in section on the plane VII-VII of FIG. 5, each lateral wall portion 58 is curved and has a convex face oriented towards the outside of the aft fairing 30. It should be noted that the aforementioned plane VII-VII runs at right angles to the mid-plane P (FIG. 6) and parallel to the axis 50 of the turbojet engine 10 (FIG. 5).

In addition, each lateral floor portion 62 is preferably shaped so that it extends rearwards towards the jetpipe 45 (FIG. 5). Thus, the separation d1 between each lateral floor portion 62 and the jetpipe 45 at the front end of the corresponding lateral wall portion 58 is greater than the separation d2 between each lateral floor portion 62 and the jetpipe 45 at the rear end of the corresponding lateral wall portion 58 (FIG. 6).

As an alternative, the abovementioned separations d1 and d2 may be equal without departing from the scope of the invention.

In addition, the separation d2 between each lateral floor portion 62 and the jetpipe 45 at a rear end of the corresponding lateral wall portion 58 is comprised between 2% and 15% of a maximum width d3 of the aft fairing 30 at a trailing edge 65 of the jetpipe 45. That should be understood as meaning that the maximum width d3 is measured in a transverse plane defined by the trailing edge 65. In the example illustrated, the fairing 30 has a substantially rectangular cross section so that its width d3 is substantially constant in the height direction Z. As an alternative, the fairing 30 may have a different cross section, in which case the maximum width d3 considered is the width measured at a height Z at which the fairing 30 has its maximum width.

In operation, a part 66 of the bypass flow 38 (FIG. 7) enters each of the two air passage spaces 60 as it flows along the two lateral wall portions 58, and emerges at the rear under the rear part 44 of the floor 36 of the aft fairing 30.

The said part 66 of the bypass flow thus forms a film of relatively cool air between the floor 36 and a part 42' of the primary flow 42 made up of exhaust gases ducted by the jetpipe 45.

The said part 66 of the bypass flow makes it possible to protect the rear part 44 of the floor 36 and the lateral walls 32 from the heat of the primary flow 42 in a simple and effective way.

As FIG. 5 shows, the floor 36 of the aft fairing 30 has no rebating, and this makes it possible to limit the disturbance to the flow of the said part 66 of the bypass flow and thus encourage this flow to remain in contact with the rear part 44 of the floor 36.

Figure 8:
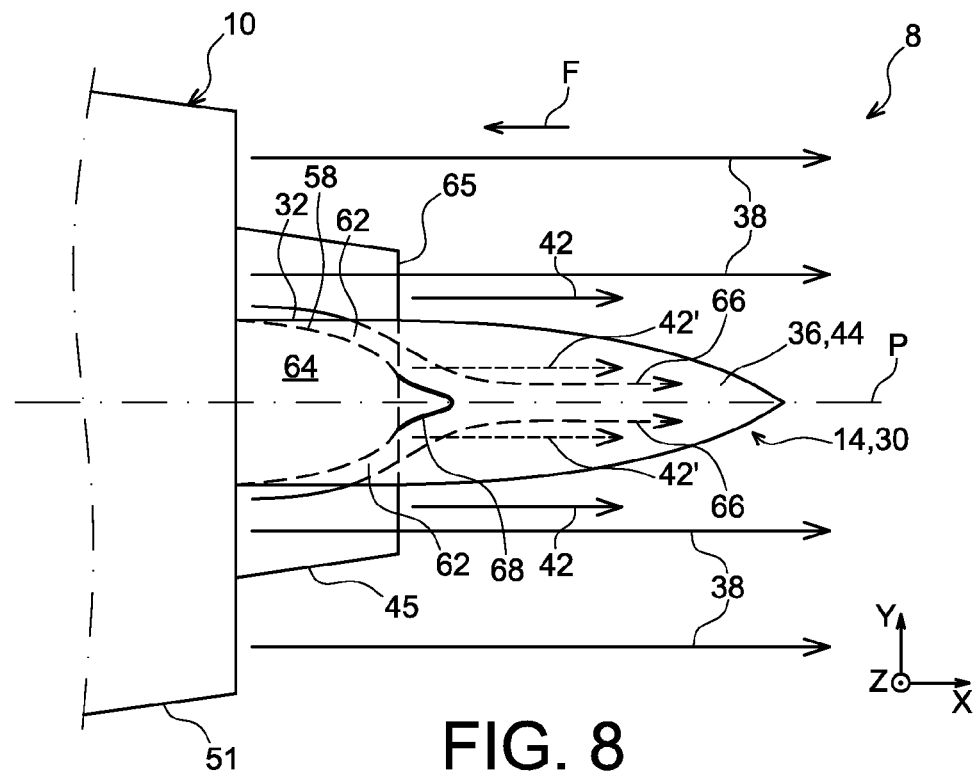
FIG. 8 is a view similar to FIG. 4, illustrating a propulsion system according to a second preferred embodiment of the invention.
Figure 9:
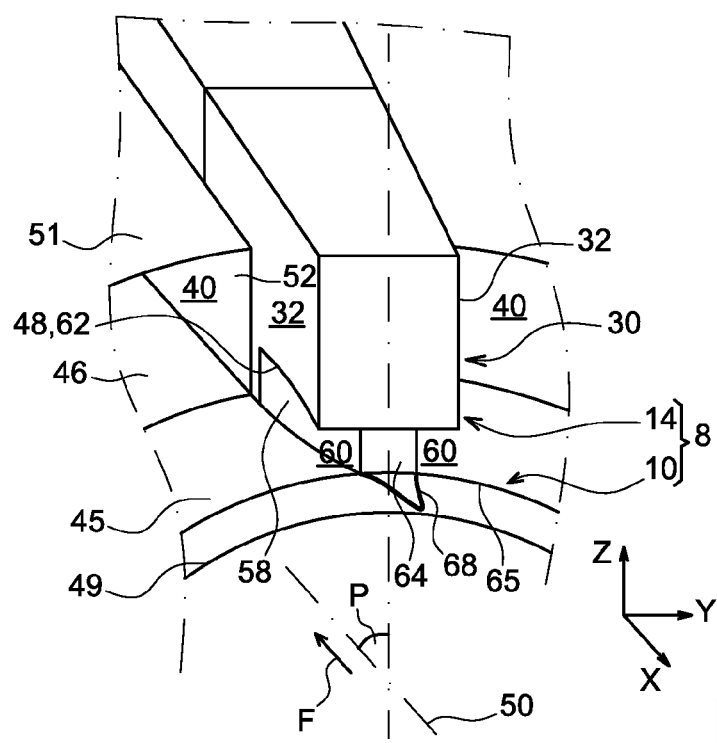
FIG. 9 is a view similar to FIG. 3, illustrating the propulsion system of FIG. 8.

FIGS. 8 and 9 illustrate a propulsion system 8 according to a second preferred embodiment of the invention, which differs from the propulsion system of FIGS. 5 to 7 in that the jetpipe 45 has an extension 68 extending rearwards from the foot of the base 64. In the example illustrated, the extension 68 is centred with respect to the mid-plane P of the aft fairing 30 and has the shape of a gaussian distribution curve, namely a rounded chevron.

The length of the extension 68 is preferably comprised between 5% and 30% of the length of the rear part 44 of the floor 36 of the aft fairing 30. By definition, this rear part 44 extends from the rear end of the jetpipe 45.

The extension 68 improves the guidance of the part 66 of the bypass flow along the rear part 44 of the floor 36.

There are other possible shapes that the extension 68 may take, for example a trapezoidal, triangular or even rectangular shape.

In addition, the extension 68 may have a curvature oriented towards the axis 50 of the turbojet engine 10, i.e. downwards in the example illustrated.

The invention claimed is:

1. A propulsion system for an aircraft, the propulsion system comprising:
   a bypass turbojet engine; and
   a pylon for attaching the bypass turbojet engine to an airframe of the aircraft, the pylon comprising an aft fairing comprising two lateral walls, a floor to protect the pylon from a heat of a primary flow ducted by a jetpipe of the bypass turbojet engine, and, formed in each of the two lateral walls, a recess in a form of an air passage, wherein each recess is respectively defined by the jetpipe on a bottom of the recess, a lateral floor portion on a top of the recess, and a lateral wall portion on an inner surface of the recess,
   wherein each lateral floor portion has a surface that curves towards an exterior surface of an ejection bullet, around which the jetpipe extends,
   wherein the pylon is configured such that a base is disposed between the jetpipe and the two lateral floor portions of the pylon, the base being formed by the lateral wall portion of each of the lateral walls of the aft fairing at an end facing a rear of the propulsion system, and wherein each lateral wall portion is configured to extend towards the rear of the propulsion system and is curved towards a mid-plane of the aft fairing,
   wherein each lateral floor portion is disposed on either side of the mid-plane of the aft fairing and is separated from the jetpipe so that the lateral floor portions and the lateral wall portions, along with the jetpipe, delimit each air passage, which are open laterally and towards the rear of the propulsion system, and
   wherein the floor is configured such that at least a part of a bypass stream is injected under the lateral floor portions to form a film of cool air under the floor for protecting the pylon from the heat of the primary flow.

2. The propulsion system according to claim 1, wherein each lateral wall portion has a convex face facing towards an outside of the aft fairing when the latter is viewed in section on a plane orthogonal to the mid-plane and parallel to an axis of the bypass turbojet engine.

3. The propulsion system according to claim 1, wherein a separation between each lateral floor portion and the jetpipe at a rear end of a corresponding lateral wall portion is between 2% and 15% of a maximum width of the aft fairing at a trailing edge of the jetpipe.

4. The propulsion system according to claim 1, wherein the jetpipe comprises an extension configured to extend as a projection rearwards and to face the floor of the aft fairing.

5. The propulsion system according to claim 1, wherein the two lateral walls of the aft fairing extend, respectively, in a continuation of two fork walls which connect together two annular cowls which, respectively, on an inside and on an outside thereof, delimit an annular space in which the bypass stream flows through the bypass turbojet engine.

6. The propulsion system according to claim 1, wherein the floor of the aft fairing comprises a forward part configured to extend in line with the jetpipe to a rear end of the jetpipe and a rear part configured to extend rearwardly from the jetpipe, so as to be substantially continuous with the forward part.

7. An aircraft comprising at least one propulsion system according to claim 1.

* * * * *